United States Patent
Xu et al.

(10) Patent No.: US 10,632,595 B2
(45) Date of Patent: Apr. 28, 2020

(54) BEARING FLATFORM, BEARING DEVICE AND LASER CUTTING APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qingyang Xu, Beijing (CN); Sheng Tao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 186 days.

(21) Appl. No.: 15/159,168

(22) Filed: May 19, 2016

(65) Prior Publication Data
US 2017/0080548 A1 Mar. 23, 2017

(30) Foreign Application Priority Data
Sep. 18, 2015 (CN) .......................... 2015 1 0600805

(51) Int. Cl.
| B25B 11/00 | (2006.01) |
| B23K 37/04 | (2006.01) |
| B23K 26/38 | (2014.01) |
| B23K 26/08 | (2014.01) |
| B23K 101/36 | (2006.01) |

(52) U.S. Cl.
CPC .......... *B25B 11/005* (2013.01); *B23K 26/083* (2013.01); *B23K 26/38* (2013.01); *B23K 37/0408* (2013.01); *B23K 2101/36* (2018.08)

(58) Field of Classification Search
None
See application file for complete search history.

(56) References Cited

U.S. PATENT DOCUMENTS 2,694,337 A * 11/1954 Anander ................ G03B 27/20
248/363
5,671,910 A * 9/1997 Davies .................. B25B 11/005
269/21
(Continued)

FOREIGN PATENT DOCUMENTS

| CN | 101450468 A | 6/2009 |
| CN | 101462205 A | 6/2009 |

(Continued)

OTHER PUBLICATIONS

English Mach Translation of CN102758831A, attached as pdf.*
(Continued)

*Primary Examiner* — Brian D Keller
(74) *Attorney, Agent, or Firm* — Nath, Goldberg & Meyer; Joshua B. Goldberg; Stephanie Majkut

(57) ABSTRACT

A bearing flatform, a bearing device and a laser cutting apparatus. The bearing flatform comprises a bearing plate and a porous film arranged on a hearing surface of the bearing plate. A plurality of first through holes penetrating through the bearing plate are formed in the bearing plate and configured to be connected with a pumping hole of an air pump.

8 Claims, 2 Drawing Sheets

(56) References Cited

U.S. PATENT DOCUMENTS

| | | | | |
|---|---|---|---|---|
| 6,328,096 B1* | 12/2001 | Stone | ............... | H01L 21/67103 |
| | | | | 118/728 |
| 8,646,764 B2* | 2/2014 | Barlier | ............... | B25B 11/005 |
| | | | | 269/20 |
| 2002/0037237 A1* | 3/2002 | Mainquist | ............... | B01L 9/523 |
| | | | | 422/63 |
| 2003/0180495 A1* | 9/2003 | Ito | ............... | B25B 11/005 |
| | | | | 428/64.4 |
| 2015/0041524 A1* | 2/2015 | Khanna | ............... | B23K 3/087 |
| | | | | 228/213 |

FOREIGN PATENT DOCUMENTS

| | | |
|---|---|---|
| CN | 101774087 A | 7/2010 |
| CN | 201931208 U | 8/2011 |
| CN | 102758831 A | 10/2012 |
| CN | 103170750 A | 6/2013 |
| CN | 104046945 A | 9/2014 |
| CN | 203817635 U | 9/2014 |
| CN | 104384724 A | 3/2015 |
| JP | 2-247097 A | 10/1990 |
| TW | 201233649 A | 8/2012 |

OTHER PUBLICATIONS

Second Office Action dated Dec. 26, 2016 in corresponding Chinese Application No. 201510600805.4.
1st office action issued in corresponding Chinese application No. 201510600805.4 dated Apr. 27, 2016.

* cited by examiner

BEARING FLATFORM, BEARING DEVICE AND LASER CUTTING APPARATUS

CROSS REFERENCE TO RELATED APPLICATION

The present application claims priority to Chinese Patent Application No. 201510600805.4, filed on Sep. 18, 2015, and entitled "BEARING FLATFORM, BEARING DEVICE AND LASER CUTTING APPARATUS", the contents of which are herein incorporated by reference in the entirety.

FIELD OF THE INVENTION

The present disclosure relates to the production field of display devices, and specifically relates to a bearing flatform, a bearing device and a laser cutting apparatus.

BACKGROUND OF THE INVENTION

In the manufacturing process of a display, a laser cutting apparatus is generally used to cut a large-sized substrate to obtain substrates with required size. A bearing device is used for bearing and fixing the substrate in the process of cutting the substrate, and the structure and performance of the bearing device have great influence on the cutting efficiency and the cutting effect.

SUMMARY OF THE INVENTION

The present disclosure provides a bearing flatform, a bearing device and a laser cutting apparatus that can improve production efficiency.

Embodiments of the present disclosure provide a bearing flatform, including: a bearing plate, in which a plurality of first through holes are formed, the first through holes penetrating through the bearing plate and configured to be connected with a pumping hole of an air pump; and a porous film arranged on a bearing surface of the bearing flatform.

Optionally, the porous film is made of ultra-high molecular weight polyethylene.

Optionally, the bearing flatform further includes a cover plate arranged on the porous film; the cover plate, the porous film and the bearing plate are fixedly connected with each other; a plurality of second through holes penetrating through the cover plate are formed in the cover plate; and a surface of the cover plate away from the bearing plate has a flatness of ±100 μm.

Optionally, a plurality of protrusions are formed on a surface of the cover plate facing the bearing plate, and the bearing plate is provided thereon with grooves corresponding to the protrusions; or, a plurality of protrusions are formed on a surface of the bearing plate facing the cover plate, and the cover plate is provided thereon with grooves corresponding to the protrusions; and third through holes corresponding to the protrusions are formed in the porous membrane, and the protrusions penetrate through the third through holes and extend into the corresponding grooves.

Optionally, the cover plate is a glass cover plate, and the surface of the cover plate away from the bearing plate is a frosted surface.

Optionally, a roughness of the frosted surface is in a range from Ra25 to Ra100.

Optionally, guide wheels are arranged at sides of the bearing plate.

Optionally, the bearing flatform further includes a limiting frame arranged on the bearing plate, a top of the limiting frame protrudes from an upper surface of the cover plate, and the limiting frame is used for defining an area for bearing a substrate.

Optionally, the limiting frame is a semi-closed frame formed by three baffles provided at edges of the bearing plate.

Embodiments of the present disclosure further disclose a bearing device, including a sucking base and the above bearing flatform provided by the embodiments of the present disclosure, wherein the bearing flatform is placed on the sucking base during the use of the bearing device, a cavity is formed in the sucking base, the sucking base includes an air outlet for connecting the cavity to the pumping hole of the air pump and a plurality of sucking holes for connecting the plurality of first through holes in the bearing flatform to the cavity.

Embodiments of the present disclosure further provide a laser cutting apparatus, including the above bearing device provided by the embodiments of the present disclosure.

Optionally, guide wheels are arranged on the sides of the hearing plate, and the laser cutting apparatus further includes guide groove; when the bearing flatform is positioned in the guide groove, the guide wheels can roll along the guide groove.

In the embodiments of the present disclosure, the bearing flatform includes a bearing plate and a porous film, and a plurality of tiny air holes are formed in the porous film to allow air to pass through the porous film under relatively high suction resistance. When the bearing flatform bearing a substrate is placed on the sucking base and air is pumped by the air pump, even if the first through holes outside the substrate area are not covered, the speed that air enters the cavity via the first through holes is further lower than the pumping speed of the air pump, so that the substrate can be stably sucked. Thus, when the bearing flatform and the sucking base of the present disclosure cooperate to bear and suck the substrate, the first through holes outside the area of the substrate do not need to be covered, so that the time on a production line is shortened and the production efficiency is improved. Moreover, the bearing flatform further includes a glass cover plate. The surface (i.e., the surface for placing the substrate) of the cover plate away from the bearing plate is a frosted surface, so that cutting chips of the substrate can be prevented from being attached onto the surface of the cover plate. Moreover, guide wheels are arranged on the sides of the bearing plate, so that the bearing flatform can move more stably. A limiting frame is further arranged on the bearing plate, so that the substrate can be prevented from being separated from the bearing flatform when the motion state of the bearing flatform is abruptly changed.

BRIEF DESCRIPTION OF THE DRAWINGS

The accompanying drawings, which constitute a part of the description, are used for providing further understanding of the present disclosure, and interpreting the present disclosure together with specific embodiments below, rather than limiting the present disclosure. In the drawings.

DESCRIPTION OF THE PREFERRED EMBODIMENT

The specific embodiments of the present disclosure will be described in detail below in combination with the accompanying drawings. It should be understood that, the specific embodiments described herein are merely used for describing and interpreting the present disclosure, rather than limiting the present disclosure.

Figure 1:
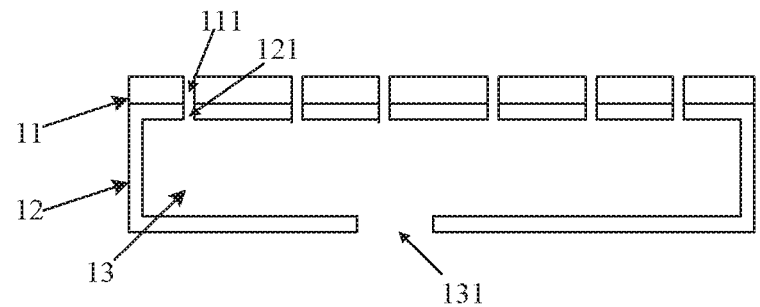
FIG. 1 is a schematic diagram of a bearing device in the prior art.

FIG. 1 shows a schematic diagram of a structure of a known bearing device. The bearing device includes a bearing flatform 11 and a sucking base 12. A cavity 13 is formed in the sucking base 12. The bearing flatform 11 is generally a hard plastic board having through holes 111. Sucking holes 121 and an air outlet 131 are formed in the sucking base 12. The through holes 111 are connected with the sucking holes 121 correspondingly, and the air outlet 131 connects the cavity 13 to a pumping hole of an air pump, so that the through holes 111 are connected with the pumping hole of the air pump. When a substrate is placed on the bearing flatform, the substrate can be sucked onto the bearing flatform 11 by the pumping effect of the air pump. When sucking the substrate the through holes outside the area of the substrate need to be covered or blocked, so as to prevent the cavity from being connected to the outside to fail to suck the substrate. It takes certain time to cover the through holes, particularly when substrates with different sizes are borne, the covered areas are also different, and re-coverage may prolong time of a production line, so that the production efficiency is lowered.

Figure 2:
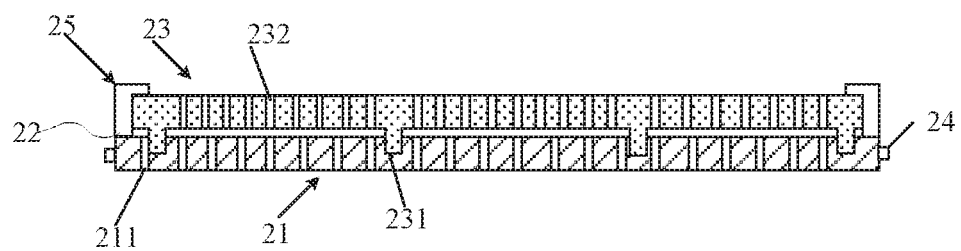
FIG. 2 is a schematic diagram of a structure of a bearing flatform in an embodiment of the present disclosure.

As one aspect of the present disclosure, there is provided a hearing flatform, which, as shown in FIG. 2, includes a bearing plate 21 and a porous film 22 arranged on a bearing surface of the bearing plate 21. A plurality of first through holes 211 penetrating through the bearing plate 21 are formed in the bearing plate 21, the first through holes being configured to be connected to a pumping hole of an air pump (not shown), and the bearing plate 21 has a bearing surface (namely, the upper surface of the bearing plate 21 in FIG. 2).

In the prior art, when the bearing flatform hearing a substrate is placed on the sucking base and the substrate is sucked by the pumping effect of the air pump, if the first through holes outside the area of the substrate are not covered, air will enter the cavity of the sucking base when the air pump pumps air, so that the negative pressure required by the sucking cannot be reached in the cavity. However, in the present disclosure, the bearing plate includes a hearing plate 21 and a porous film 22, and a plurality of tiny air holes are formed in the porous film 22 to allow air to pass through the porous film under relatively high suction resistance. When the hearing flatform bearing a substrate is placed on the sucking base and air is pumped by the air pump, even if the first through holes outside the substrate area are not covered, the speed that air enters the cavity via the first through holes is further lower than the pumping speed of the air pump, so that the substrate can be stably sucked. Thus, when the bearing flatform and the sucking base of the present disclosure cooperate to bear and suck the substrate, the first through holes outside the area of the substrate do not need to be covered, so that the time on a production line is shortened and the production efficiency is improved.

Specifically, the porous film 22 is made of ultra-high molecular weight polyethylene. In the present disclosure, the porous film 22 may be Sunmap produced by Nitto Denko Corporation.

The bearing flatform of the present disclosure is particularly suitable for a laser cutting apparatus. The bearing flatform bearing a substrate moves to the position of the sucking base, and the substrate is sucked onto the bearing flatform by the pumping effect of the air pump and cut with laser. After the cutting, the substrate is conveyed by the bearing flatform and separated from the bearing flatform in a toppling manner.

Further, the bearing flatform further includes a cover plate 23 arranged on the porous film 22. The cover plate 23, the porous film 22 and the bearing plate 21 are fixedly connected with each other. A plurality of second through holes 232 penetrating through the cover plate 23 are formed in the cover plate 23, and the surface of the cover plate 23 away from the bearing plate 21 has a flatness of ±100 μm, to prevent the substrate from shifting when the bearing flatform drives the substrate to move, thus preventing a laser focusing point from deviating from a position to be cut during laser cutting.

The plurality of second through holes 232 of the cover plate 23 may be in one-to-one correspondence with the plurality of first through holes 211 of the bearing plate 21. Alternatively, the number of the second through holes 232 may be greater than that of the first through holes 211, and at the same time, apertures of the second through holes 232 are smaller than those of the first through holes 211. Because the porous film 22 has a certain thickness and is air-permeable, no matter whether the first through holes 211 and the second through holes 232 are in one-to-one correspondence, the borne substrate can be sucked onto the cover plate when the pumping hole of the air pump is connected with the plurality of first through holes 211 and air is pumped.

The cover plate 23 may be made of a material unlikely to deform, such as glass.

Figure 3:
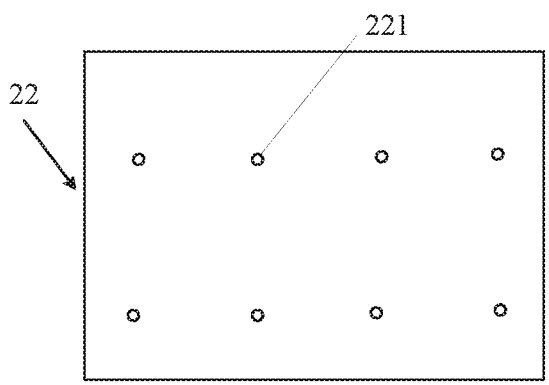
FIG. 3 is a top view of a porous film of a bearing flatform in an embodiment of the present disclosure.
Figure 4:
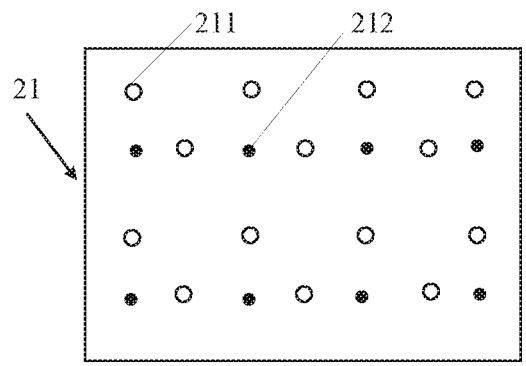
FIG. 4 is a top view of a hearing plate of a bearing flatform in an embodiment of the present disclosure.

The cover plate 23, the porous film 22 and the bearing plate 21 may be fixedly connected with each other in various ways. In a specific example, as shown in FIG. 2 to FIG. 4, a plurality of protrusions 231 are formed on the surface of the cover plate 23 facing the bearing plate 21, grooves 212 corresponding to the protrusions are provided on the bearing plate 2, third through holes 221 corresponding to the protrusions are formed in the porous film 22, and the protrusions 231 penetrate through the third through holes 221 and go into the corresponding grooves 212, so that the cover plate 23, the porous film 22 and the bearing plate 21 are fixedly connected with each other. Alternatively, a plurality of protrusions are formed on the surface of the bearing plate 21 facing the cover plate 23, grooves corresponding to the protrusions are provided on the cover plate 23, third through holes 221 corresponding to the protrusions are formed in the porous film 22, and the protrusions penetrate through the third through holes and go into the corresponding grooves, so that the porous film 22 is fixed between the cover plate 23 and the bearing plate 21.

Further, the surface of the cover plate 23 away from the bearing plate 21 is a frosted surface.

Some tiny chips may be produced after the laser cutting, and the frosted surface can prevent the chips from being attached onto the cover plate 23, so that the cover plate can be cleaned more easily. When the cover plate 23 is a glass cover plate, the hardness of the cover plate 23 is similar to that of the substrate, and therefore, the frosted surface of the cover plate 23 will not wear the substrate.

Specifically, the roughness of the frosted surface is in a range from Ra25 to Ra100, so as to ensure that the substrate on the bearing flatform can be stably sucked when the bearing flatform is arranged on the sucking base.

As shown in FIG. 2, guide wheels 24 are arranged on sides of the bearing plate 21, so that the bearing flatform 21 can drive the substrate to move more stably.

In order to facilitate the installation of the guide wheels 24 and prolong the service life of the bearing plate 21, the bearing plate 21 may be made of metal, such as aluminum, iron, an alloy thereof, or the like.

Figure 5:
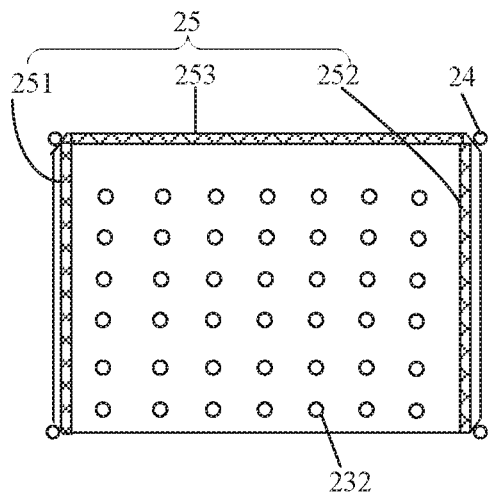
FIG. 5 is a top view of a bearing flatform in an embodiment of the present disclosure.

As shown in FIG. 5, the bearing flatform further includes a limiting frame 25 arranged on the bearing plate 21. The top of the limiting frame 25 protrudes from the upper surface of the cover plate 23. The limiting frame 25 is used for defining an area for bearing a substrate, so as to prevent the substrate from being separated from the bearing flatform when the bearing flatform drives the substrate to move.

Specifically, as shown in FIG. 5, the limiting frame 25 is a semi-closed frame formed by three baffles (251, 252, 253) that are arranged at the edges of the bearing plate 21, wherein the baffle 251 is opposite to the baffle 252, and the baffle 253 is arranged at the side of the bearing plate 21 facing the advancing direction, so as to prevent the substrate from being separated from the bearing flatform when the advancing bearing flatform suddenly stops. When laser cutting is completed and it is unnecessary to hear the substrate, the bearing flatform is inclined, so that the substrate slides off from the side at which no baffle is arranged.

Figure 6:
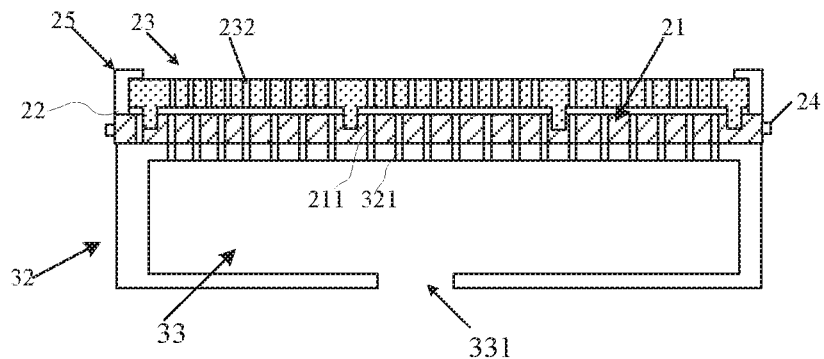
FIG. 6 is a schematic diagram of a structure of a bearing device in an embodiment of the present disclosure.

As another aspect of the present disclosure, there is provided a bearing device, including a sucking base and the above bearing flatform provided by the present disclosure. As shown in FIG. 6, a cavity 33 is formed in the sucking base 32. The sucking base 32 includes an air outlet 331 and a plurality of sucking holes 321. The sucking holes 321 are used for connecting the first through holes in the bearing plate with the cavity, and the air outlet 331 is used for connecting the cavity 33 with the pumping hole of the air pump.

The bearing plate of the present disclosure is provided with a porous film, and therefore, the first through holes outside the area of the substrate do not need to be closed, so that the time on a production line is reduced and the production efficiency is improved.

As still another aspect of the present disclosure, there is provided a laser cutting apparatus, including the above bearing device provided by the present disclosure. By using the laser cutting apparatus for cutting, time can be saved and cutting efficiency can be improved. In addition, a cover plate is arranged on the bearing flatform, and the cover plate is high in flatness and unlikely to deform, so the laser focusing point can be prevented from deviating from the position to be cut, and thus the cutting effect is improved.

Figure 7:
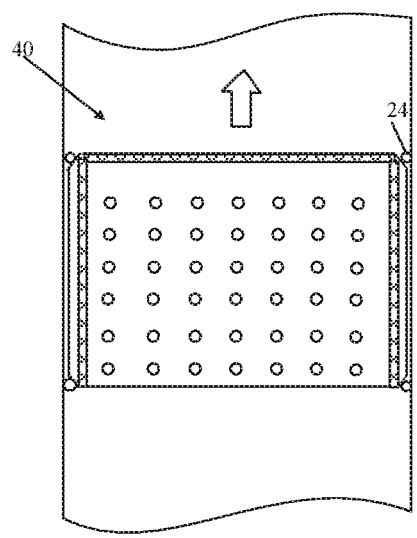
FIG. 7 is a top view illustrating that a hearing flatform moves in guide grooves in an embodiment of the present disclosure.

As mentioned above, guide wheels 24 are arranged on the sides of the bearing plate. The laser cutting apparatus further includes guide grooves, as shown in FIG. 7. When the bearing flatform is positioned in the guide grooves 40, the guide wheels 24 can roll along the guide grooves, so as to keep movement stability of the bearing flatform.

It could be understood that, the above embodiments are merely exemplary embodiments adopted for describing the principle of the present disclosure, but the present disclosure is not limited thereto. For those of ordinary skill in the art, various variations and improvements may be made without departing from the spirit and essence of the present disclosure, and these variations and improvements shall fall into the protection scope of the present disclosure.

The invention claimed is:

1. A bearing device, comprising a sucking base and a bearing flatform, the bearing flatform, comprising:
   a bearing plate, in which a plurality of first through holes are formed, the first through holes penetrating through the bearing plate and being configured to be connected with a pumping hole of an air pump;
   a porous film arranged on a bearing surface of the bearing plate; and
   a cover plate arranged on the porous film,
   wherein the cover plate, the porous film and the bearing plate are fixedly connected with each other, a plurality of second through holes penetrating through the cover plate are formed in the cover plate;
   wherein the number of the second through holes is greater than that of the first through holes, the plurality of first through holes are evenly distributed, and the plurality of second through holes are evenly distributed; and
   wherein a surface of the cover plate away from the bearing plate is a frosted surface,
   wherein the bearing flatform is placed on the sucking base during the use of the bearing device;
   wherein a cavity is formed in the sucking base, the sucking base comprises an air outlet for connecting the cavity with the pumping hole of the air pump and a plurality of sucking holes for connecting the plurality of first through holes in the bearing flatform with the cavity; and
   wherein the plurality of sucking holes are connected to the air outlet through the cavity, and the plurality of sucking holes are in a surface of the sucking base proximal to the bearing flatform and in direct contact with the bearing flatform.

2. The bearing device of claim 1, wherein a plurality of protrusions are formed on a surface of the cover plate facing the bearing plate, and grooves corresponding to the protrusions are provided on the bearing plate; or, a plurality of protrusions are formed on a surface of the bearing plate facing the cover plate, and grooves corresponding to the protrusions are provided on the cover plate; and
   third through holes corresponding to the protrusions are formed in the porous film, and the protrusions penetrate through the third through holes and go into the corresponding grooves.

3. The bearing device of claim 1, wherein the cover plate is a glass cover plate, the surface of the cover plate away from the bearing plate has a flatness of ±100 μm, and a roughness of the frosted surface is in a range from Ra25 to Ra100.

4. The bearing device of claim 1, wherein guide wheels are arranged at sides of the bearing plate.

5. The bearing device of claim 1, wherein the porous film is made of ultra-high molecular weight polyethylene.

6. The bearing device of claim 1, wherein the plurality of sucking holes and the first through holes are in one-to-one correspondence.

7. A laser cutting apparatus, comprising a bearing device, wherein the bearing device comprises a sucking base and a bearing flatform, the bearing flatform comprising:
   a bearing plate, in which a plurality of first through holes are formed, the first through holes penetrating through the bearing plate and being configured to be connected with a pumping hole of an air pump;

a porous film arranged on a bearing surface of the bearing plate; and a cover plate arranged on the porous film, wherein the cover plate, the porous film and the bearing plate are fixedly connected with each other, a plurality of second through holes penetrating through the cover plate are formed in the cover plate;

wherein the number of the second through holes is greater than that of the first through holes, the plurality of first through holes are evenly distributed, and the plurality of second through holes are evenly distributed; and wherein a surface of the cover plate away from the bearing plate is a frosted surface, wherein the bearing flatform is placed on the sucking base during the use of the bearing device; and wherein a cavity is formed in the sucking base, the sucking base comprises an air outlet for connecting the cavity with the pumping hole of the air pump and a plurality of sucking holes for connecting the plurality of first through holes in the bearing flatform with the cavity; and wherein the plurality of sucking holes are connected to the air outlet through the cavity, and the plurality of sucking holes are in a surface of the sucking base proximal to the bearing flatform and in direct contact with the bearing flatform.

8. The laser cutting apparatus of claim 7, further comprising guide grooves, wherein guide wheels are arranged at sides of the bearing plate in the bearing flatform; and when the bearing flatform is positioned in the guide grooves, the guide wheels is capable of rolling along the guide grooves.

* * * * *